United States Patent
Ogawa et al.

(10) Patent No.: US 8,173,316 B2
(45) Date of Patent: May 8, 2012

(54) FUEL CELL SYSTEM

(75) Inventors: Jumpei Ogawa, Saitama (JP); Chihiro Wake, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 950 days.

(21) Appl. No.: 12/116,138

(22) Filed: May 6, 2008

(65) Prior Publication Data

US 2008/0280174 A1    Nov. 13, 2008

(30) Foreign Application Priority Data

May 7, 2007    (JP) .................................. 2007-122008

(51) Int. Cl.
*H01M 8/04* (2006.01)

(52) U.S. Cl. ........ 429/443; 429/407; 429/408; 429/427; 429/428; 429/429; 429/430; 429/449

(58) Field of Classification Search .................. 429/407, 429/408, 427, 428, 429, 430, 443, 449
See application file for complete search history.

(56) References Cited

U.S. PATENT DOCUMENTS

| | | | |
|---|---|---|---|
| 2006/0216555 A1* | 9/2006 | Shige et al. | 429/19 |
| 2007/0059569 A1* | 3/2007 | Matsumoto et al. | 429/22 |
| 2008/0182138 A1* | 7/2008 | Salvador et al. | 429/13 |

FOREIGN PATENT DOCUMENTS

| JP | 04-267066 | 9/1992 |
|---|---|---|
| JP | 2735396 | 1/1998 |

* cited by examiner

*Primary Examiner* — Patrick Ryan
*Assistant Examiner* — Ben Lewis
(74) *Attorney, Agent, or Firm* — Nelson Mullins Riley & Scarborough LLP; Anthony A. Laurentano (57) ABSTRACT

A fuel cell system which includes: a fuel cell having a fuel gas flow path and an oxidant gas flow path and generating electricity by being supplied a fuel gas to the fuel gas flow path and an oxidant gas to the oxidant gas flow path; fuel gas supplying means; a discharge valve; fuel gas exchange means for exchanging an atmosphere inside the fuel gas flow path for the fuel gas at a starting of the system; and cold start determination means for determining whether to conduct or not to conduct the cold start of the system, wherein when the cold start determination means determines to conduct the cold start, the cold start determination means increases a total discharge amount of a gas to be discharged for exchanging the atmosphere inside the fuel gas flow path for the fuel gas, and thereby increases a fuel gas concentration in the fuel gas flow path.

12 Claims, 5 Drawing Sheets

FUEL CELL SYSTEM

CROSS REFERENCE TO RELATED APPLICATIONS

This application claims the foreign priority benefit under Title 35, United States Code, §119(a)-(d) of Japanese Patent Application No. 2007-122008, filed on May 7, 2007, the contents of which are hereby incorporated by reference.

BACKGROUND OF THE INVENTION

1. Field of the Invention

The present invention relates to a fuel cell system.

2. Description of Related Art

In recent years, a development of a fuel cell such as a polymer electrolyte fuel cell (hereinafter, referred to as PEFC), which generates electricity by being supplied hydrogen to the anode and air (oxidant gas) containing oxygen to the cathode, is more popular than before. The fuel cell described above includes an anode flow path (fuel gas flow path) through which the hydrogen is supplied to and discharged from the anode flows, and a cathode flow path (oxidant gas flow path) through which the air is supplied to and discharged from the cathode flows.

However, if a shutdown of the fuel cell continues, impurities (for example, nitrogen crossed over electrolyte membrane) may be increased in the anode flow path. Therefore, when the fuel cell is started after the shutdown, the anode may become short of hydrogen, thereby resulting in insufficient performance of electric power generation of the fuel cell.

Therefore, to avoid the above issue, a technology for starting electric power generation of a fuel cell has been proposed (see Japanese Patent No. 2735396, [0011]), in which impurities in the anode flow path is discharged when the fuel cell is started (before starting electric power generation of fuel cell), and the impurities are exchanged for hydrogen by newly supplying hydrogen to the anode flow path from, for example, a hydrogen tank. After that, when OCV (open circuit voltage) of the fuel cell becomes not less than a predetermined OCV by the exchange of the impurities, the electric power generation of the fuel cell is started.

On the other hand, if the fuel cell is exposed in a low temperature environment (for example, below freezing point) during the shutdown, a remaining moisture on a surface or inside MEA (membrane electrode assembly), which composes the fuel cell, may freeze, and thereby an effective reaction cross section (anode and cathode areas contributable to electrode reaction) of the MEA may be narrowed. If the fuel cell is permitted to start generation of electricity under the conditions that the effective reaction cross section of the MEA is narrowed as described above based on the OCV not less than a predetermined OCV, the MEA may become short of the gas, and thereby a performance of the electric power generation and stability of the fuel cell may be lowered.

Especially, the shortage of the gas tends to take place when a current output (output current) from the fuel cell is increased for increasing self-heating to promote warming up of the fuel cell since the fuel cell might freeze. It is noted that a start-up with rapid increase in temperature to a preferable temperature for the electric power generation (for example, 80 to 90° C. for PEFC) by promoting warming up of the fuel cell is called a cold start.

It is, therefore, an object of the present invention to provide a fuel cell system which hardly becomes short of a fuel gas in the MEA after staring generation of electricity when the fuel cell system is started with the cold start even if the effective reaction cross section of the MEA is narrowed.

SUMMARY OF THE INVENTION

To solve the issues described above, according to a first aspect of the present invention, there is provided a fuel cell system which includes: a fuel cell having a fuel gas flow path and an oxidant gas flow path and generating electricity by being supplied a fuel gas to the fuel gas flow path and an oxidant gas to the oxidant gas flow path; fuel gas supplying means for supplying the fuel gas to the fuel gas flow path; a discharge valve for discharging a gas in the fuel gas flow path outside; fuel gas exchange means for exchanging an atmosphere inside the fuel gas flow path for the fuel gas at a starting of the system by opening the discharge valve, while supplying the fuel gas to the fuel gas flow path from the fuel gas supplying means; and cold start determination means for determining whether to conduct or not to conduct the cold start of the system, wherein when the cold start determination means determines to conduct the cold start, the cold start determination means increases a total discharge amount of a gas to be discharged by opening the discharge valve for exchanging the atmosphere inside the fuel gas flow path for the fuel gas, thereby increasing a fuel gas concentration in the fuel gas flow path.

In the fuel cell system described above, when the cold start of the system is determined by the cold start determination means, the fuel gas exchange means increases the total discharge amount of the gas to be discharged by opening the discharge valve for exchanging the atmosphere inside the fuel gas flow path for the fuel gas, and increases the fuel gas concentration in the fuel gas flow path. As a result, the fuel gas concentration reaches to a concentration with which the MEA can normally conduct the electrode reaction even if the effective reaction cross section of the MEA is narrowed by, for example, freezing.

Under the conditions that the fuel gas concentration in the fuel gas flow path is increased as described above, the electric power generation of the fuel cell is permitted to start the electric power generation of the fuel cell, and the system is started with the cold start. Therefore, the shortage of the fuel gas in the MEA after starting the system hardly takes place. Accordingly, the fuel cell can operate with an output condition set in advance for the cold start, that is, with a high output power as well as a stable output performance, and thereby can promote warming up of the fuel cell by the cold start.

In addition, since the shortage of the fuel gas hardly takes place, the MEA is not degraded (for example, electrolysis/electric corrosion of electrolyte membrane) even if a large current is output from the fuel cell, thereby resulting in improvement of endurance of the fuel cell.

According to a second aspect of the present invention, there is provided the fuel cell system which further includes: shutdown time detection means for detecting a shutdown time of electric power generation of the fuel cell, wherein the fuel gas exchange means increases the total discharge amount of the gas to be discharged by opening the discharge valve as the shutdown time of electric power generation detected by the shutdown time detection means becomes longer.

Here, as the shutdown time of electric power generation of the fuel cell becomes longer, the impurities (for example, nitrogen) in the fuel gas flow path are increased more, and in addition, the effective reaction cross section of the MEA tends to narrow (freezing portion of MEA increases) if the fuel cell has been stopped in a low temperature environment.

In the fuel cell system described above, the fuel gas exchange means increases the total discharge amount of the gas to be discharged by opening the discharge valve as the shutdown time of electric power generation detected by the shutdown time detection means becomes longer, and thereby can increase the fuel gas concentration. That is, the total discharge amount of the gas including the impurities in the fuel gas flow path is increased in accordance with the shutdown time of electric power generation, and thereby the fuel gas concentration can be increased. With the above process, a fuel gas amount to be discharged through the discharge valve and a fuel gas amount to be supplied to the fuel gas flow path from the fuel gas supplying means can be determined correctly, thereby resulting in improvement of utilization efficiency of the fuel gas.

According to a third aspect of the present invention, there is provided the fuel cell system which further includes: temperature detection means for detecting a temperature of the fuel cell, wherein the fuel gas exchange means increases the total discharge amount of the gas to be discharged by opening the discharge valve as the temperature detected by the temperature detection means becomes lower.

Here, it is supposed that a freezing portion inside the fuel cell becomes larger, and thereby the effective reaction cross section of the MEA becomes narrower as a temperature of the fuel cell becomes lower. In addition, it is supposed that activity of the catalyst, which is included in, for example, the anode, for promoting the electrode reaction becomes lower, and thereby the effective reaction cross section becomes narrower as the temperature of the fuel cell becomes lower.

In the fuel cell system described above, the fuel gas exchange means increases the total discharge amount of the gas to be discharged by opening the discharge valve to increase the fuel gas concentration as the temperature of the fuel cell detected by the temperature detection means becomes lower. That is, the fuel gas concentration can be increased in accordance with the effective reaction cross section of the MEA. That is, the fuel gas amount to be discharged through the discharge valve and the fuel gas amount to be supplied to the fuel gas flow path from the fuel gas supplying means can be determined correctly in accordance with the effective reaction cross section, thereby resulting in improvement of utilization efficiency of the fuel gas.

According to a fourth aspect of the present invention, there is provided the fuel cell system which further includes: a diluter for mixing the gas discharged from the discharge valve and the oxidant gas discharged from the oxidant gas flow path to form a mixed gas and diluting the fuel gas with the mixed gas for discharging outside; and oxidant gas integration amount detection means for detecting an oxidant gas integration amount supplied to the diluter, wherein if the oxidant gas integration amount detected by the oxidant gas integration amount detection means is less than a predetermined integration amount, the fuel gas exchange means closes the discharge valve.

Here, the predetermined integration amount is set so that even if a gas including a fuel gas is supplied to the diluter by opening the discharge valve, a fuel gas concentration in the gas (diluted gas in the embodiment described later) to be discharged outside from the diluter is less than a predetermined concentration (for example, ignitable concentration, upper limit concentration C2 in the embodiment described later) due to dilution of the gas including the fuel gas by the oxidant gas supplied to the diluter. The predetermined integration amount is determined based on a flow rate of the oxidant gas supplied to the diluter, a volume of the diluting space inside the diluter, and etc.

In the fuel cell system described above, the fuel gas can be discharged after lowering the fuel gas concentration by diluting the fuel gas with the mixed gas which is formed by mixing the gas, which includes the fuel gas, discharged from the discharge valve with the oxidant gas discharged from the oxidant gas flow path by the diluter.

In addition, if the oxidant gas integration amount, which is detected by the oxidant gas integration amount detection means, supplied to the diluter is less than the predetermined integration amount, the fuel gas exchange means closes the discharge valve. Therefore, the fuel gas is prevented from being discharged without being diluted less than the predetermined concentration by the diluter.

It is preferable that after the discharge valve is closed, the integration amount is reset to zero, and when the oxidant gas integration amount becomes not less than the predetermined integration amount, the discharge valve is opened. With the constitution described above, the total discharge amount of the gas to be discharged by opening the discharge valve is divided, that is, the discharge valve is opened and closed plural times. Therefore, the fuel gas concentration inside the fuel gas flow path can be increased by opening the discharged valve, while responding to diluting conditions (for example, flow rate of oxidant gas and volume of diluting space).

According to a fifth aspect of the present invention, there is provided the fuel cell system which further includes: a fuel gas sensor for detecting a fuel gas concentration in the gas to be discharged outside, wherein if the fuel gas concentration detected by the fuel gas sensor is not less than a predetermined concentration, the fuel gas exchange means closes the discharge valve.

In the fuel cell system described above, since the fuel gas exchange means closes the discharge valve if the fuel gas concentration detected by the fuel gas sensor is not less than the predetermined concentration (upper limit concentration C2 in embodiment described later), the fuel gas having not less than the predetermined concentration can be prevented from being discharged outside.

In addition, according to a sixth aspect of the present invention, there is provided the fuel cell system which further includes: permission determination means for determining permission of electric power generation of the fuel cell, wherein if a current total purge amount becomes not less than a target total purge amount, the permission determination means determines permission of electric power generation of the fuel cell.

In the fuel cell system described above, since the permission determination means determines permission of electric power generation of the fuel cell when the current total purge amount becomes not less than the target total purge amount, the hydrogen concentration in the anode flow path can be prevented from shortage of hydrogen after the electric power generation is started.

According to the present invention, a fuel cell system can be provided, in which when the system is started with a cold start, the fuel cell system is hardly becomes short of fuel gas in a MEA after electric power generation is started even if an effective reaction cross section of the MEA is narrowed.

DETAILED DESCRIPTION OF THE PREFERRED EMBODIMENT

Hereinafter, one embodiment of the present invention will be explained by referring to figures as needed.

<<Constitution of Fuel Cell System>>

Figure 1:
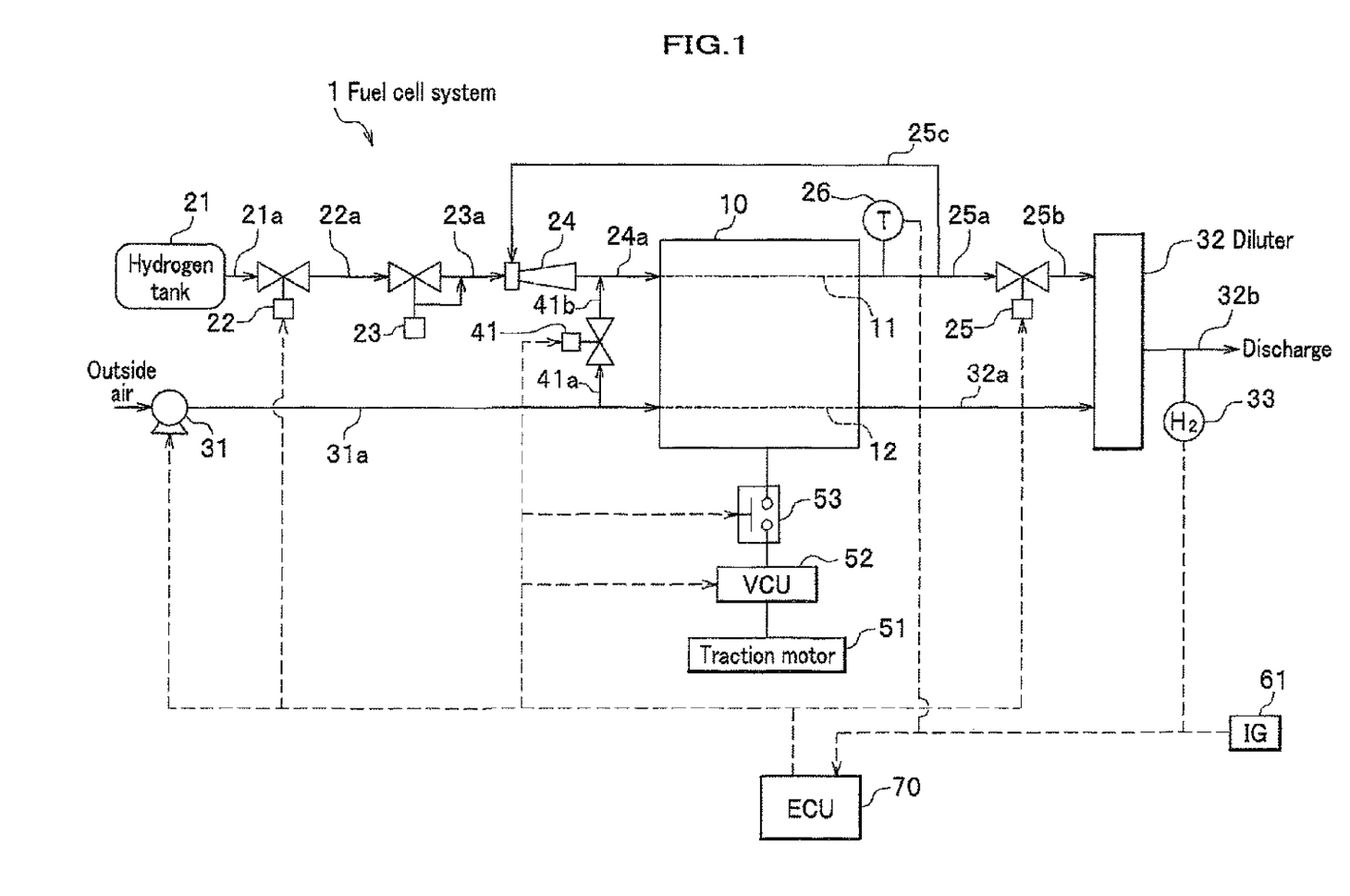
FIG. 1 is a constitution diagram of a fuel cell system according to an embodiment of the present invention.

A fuel cell system 1 according to the embodiment shown in FIG. 1 is installed in a fuel cell vehicle (mobile object), which is not shown. The fuel cell system 1 includes a fuel cell stack 10, an anode system (fuel gas supplying means) supplying and discharging hydrogen (fuel gas) to and from an anode of the fuel cell stack 10, a cathode system supplying and discharging air (oxidant gas) including oxygen to and from a cathode of the fuel cell stack 10, a scavenging system introducing a scavenging gas (non-humidified air) to the anode system from the cathode system when the fuel cell stack 10 is scavenged, an electric power consuming system consuming, for example, an electric power generated by the fuel cell stack 10, IG 61 (ignition), and ECU 70 (electronic control unit) electronically controlling constituents described above.

Here, a scavenging of the fuel cell stack 10 is to push out, for example, moisture in the fuel cell stack 10 outside. In the embodiment, a case that non-humidified air from a compressor 31 is used as the scavenging gas is exemplified. However, the scavenging gas is not limited to this, and for example, nitrogen from a nitrogen tank may be used for the scavenging gas.

In addition, in the embodiment, the scavenging of the fuel cell stack 10 is conducted when the fuel cell system 1 may be exposed to a low temperature environment after stopping the operation, that is, during a shutdown, and thereby an inner side of the system including the fuel cell stack 10 may freeze.

If the fuel cell stack 10 is scavenged, atmospheres of an anode flow path 11 and a cathode flow path 12, which will be described later, disposed on both sides of the MEA are exchanged for the scavenging gas, that is, for the non-humidified air, and the system stops filled with the air. Therefore, a potential difference (OCV) is not generated in the MEA during a shutdown of the system, thereby the MEA is not exposed to an electric field. Accordingly, the MEA is prevented from degrading (for example, electrolysis of electrolyte membrane).

Hereinafter, each constituent of the fuel cell system 1 will be explained in detail.

<Fuel Cell Stack>

The fuel cell stack 10 is a stack constituted by stacking a plurality (for example, 200 to 400 sheets) of single polymer electrolyte fuel cells (PEFC), and the plurality of the single polymer electrolyte fuel cells are connected in series. The single cell includes MEA and two electrically conductive separators sandwiching the MEA. The MEA includes an electrolyte membrane (polymer electrolyte membrane) composed of, for example, monovalent cation-exchange membrane and an anode and cathode sandwiching the electrolyte membrane.

The anode and cathode are mainly composed of a porous body such as a carbon paper having electric conductivity, and includes catalysts (for example, Pt, Ru) for causing electrode reaction at the anode and cathode.

In each separator, grooves for supplying hydrogen and air on entire surface of each MEA and through-holes for supplying and discharging hydrogen or air to and from all single cells are formed, and the grooves and though-holes function as the anode flow path 11 (fuel gas flow path) and cathode flow path 12 (oxidant gas flow path). Therefore, volumes of the anode flow path 11 and cathode flow path 12 in the fuel cell stack 10 depend on a shape and length of the grooves and a number of stacked single cell, and are fixed values determined based on specifications of the fuel cell stack 10.

Then, if hydrogen is supplied to each anode via the anode flow path 11 and air is supplied to each cathode via the cathode flow path 12, an electrode reaction is caused to generate a potential difference (OCV) in each single cell. Next, if there is a request for generating electricity under generation of the OCV, if a contactor 53, which will be described later, is turned ON, if VCU 52 is controlled, and if a current is taken out based on the request, then, the fuel cell stack 10 starts generating electricity.

<Anode System>

The anode system includes a hydrogen tank 21, a cutoff valve 22, a pressure regulator 23, an ejector 24, a purge valve 25 (discharge valve), and a temperature sensor 26 (temperature detection means).

The hydrogen tank 21 is connected to an inlet of the anode flow path 11 via a pipe 21a, the cutoff valve 22, a pipe 22a, the pressure regulator 23, a pipe 23a, the ejector 24 and a pipe 24a. If the cutoff valve 22 is opened by the ECU 70, hydrogen is supplied to the anode flow path 11 from the hydrogen tank 21 via, for example, the cutoff valve 22. As described above, the fuel gas supplying means in the embodiment is composed of the hydrogen tank 21, the cutoff valve 22, the pressure regulator 23, and the ejector 24.

The anode flow path 11 is connected to a diluter 32, which will be described later, via a pipe 25a, the purge valve 25, and a pipe 25b. In addition, the pipe 25a is connected to the ejector 24 at the middle of the pipe 25a via a pipe 25c.

The purge valve 25 is an ON-OFF valve controlled by the ECU 70, and set to be closed when the fuel cell stack 10 generates electricity. Therefore, an anode off-gas containing unreacted hydrogen discharged from the anode flow path 11 is returned to the ejector 24 via the pipe 25c. The returned hydrogen is supplied again to the anode flow path 11 to circulate the hydrogen. That is, the fuel cell system 1 includes a hydrogen circulating system, thereby resulting in efficient utilization of hydrogen.

On the other hand, when an output power of the fuel cell stack 10 and/or single cell lowers due to a lot of impurities (for example, moisture, nitrogen) accompanying the circulating hydrogen, the purge valve 25 is opened for discharging the impurities, and the anode off-gas is supplied to the diluter 32.

In addition, at a starting of the system, the purge valve 25 is opened as needed by the ECU 70 to exchange atmosphere inside the anode flow path 11 for hydrogen to increase hydrogen concentration inside the anode flow path 11.

The temperature sensor 26 is disposed in the pipe 25a, and detects a temperature inside the pipe 25a as a temperature T1 (FC temperature) of the fuel cell stack 10. The temperature sensor 26 is connected to the ECU 70, and the ECU 70 detects the temperature T1 of the fuel cell stack 10.

<Cathode System>

The cathode system includes the compressor 31, the diluter 32 (diluting device), and a hydrogen sensor 33 (fuel gas sensor).

The compressor 31 is connected to an inlet of the cathode flow path 12 via a pipe 31a. If the compressor 31 is operated according to an instruction of the ECU 70, an air containing oxygen is included and supplied to the cathode flow path 12. In addition, a humidifier (not shown) is disposed in the pipe 31a, and the air supplied to the cathode flow path 12 is humidified as needed. It is noted that when the fuel cell stack 10 is scavenged, the air from the compressor 31 bypasses the humidifier, and a non-humidified air is supplied to the anode flow path 11 and/or cathode flow path 12 as a scavenging gas.

An outlet of the cathode flow path 12 is connected to the diluter 32 via a pipe 32a, and a cathode off-gas discharged from a cathode of the fuel cell stack 10 is supplied to the diluter 32.

The diluter 32 is a device for mixing the anode off-gas to be introduced from the anode system by opening the purge valve 25 with the cathode off-gas (oxidant gas, diluting gas) discharged from the cathode flow path 12, thereby diluting hydrogen in the anode off-gas. The diluter 32 has a mixing space for diluting the hydrogen by mixing the anode off-gas and cathode off-gas. The gas after diluted (diluted gas) is discharged outside a vehicle (outside) via the pipe 32b.

The hydrogen sensor 33 is disposed in a pipe 32b, and detects a hydrogen concentration C1 in the diluted gas to be discharged outside the vehicle after diluted in the diluter 32. In addition, the hydrogen sensor 33 is connected to the ECU 70, and the ECU 70 detects the hydrogen concentration C1.

<Scavenging System>

The scavenging system is a system for introducing a scavenging gas to the anode system from the cathode system when the fuel cell stack 10 is scavenged, and includes a scavenging valve 41 to be opened on scavenging. The pipe 31a is connected to a middle of the pipe 24a at a middle of the pipe 31a via a pipe 41a, the scavenging valve 41, and a pipe 41b. Next, if the ECU 70 opens the scavenging valve 41 while operating the compressor 31, the scavenging gas (non-humidified air from compressor 31) is supplied to the anode flow path 11 via the scavenging valve 41 and etc.

<Electric Power Consuming System>

The electric power consuming system is a system which, for example, consumes a generated electric power of the fuel cell stack 10, and includes a traction motor 51 which is a source of power of a fuel cell vehicle, the VCU 52 (voltage control unit), and the contactor 53. The VCU 52 is a device for controlling an electric power output (current, voltage) of the fuel cell stack 10 and includes, for example, DC/DC chopper. The contactor 53 is a switch for turning ON/OFF electric connection between the fuel cell stack 10 and the VCU 52 and traction motor 51. The traction motor 51 is connected to an output terminal of the fuel cell stack 10 via a PDU (power drive unit, not shown) which generates three-phase alternating current, the VCU 52, and the contactor 53 in this order.

If the ECU 70 controls the VCU 52 based a request of electric power generation while making the contactor 53 ON, a current is output from the fuel cell stack 10, the fuel cell stack 10 generates electricity, and the traction motor 51 rotates. On the other hand, when the contactor 53 is turned OFF, the fuel cell stack 10 does not generate electricity since a current is not output from the fuel cell stack 10.

In addition, the electric power consuming system includes, for example, a battery unit and a DC/DC converter (both not shown). The battery unit stores an excess electric power generated by the fuel cell stack 10 and a regenerative electric power from the traction motor 51. Then, when an electric power generation of the fuel cell stack 10 is low, the stored electric power is discharged to supplement the fuel cell stack 10. The DC/DC converter increases or decreases a voltage of the electric power to be charged to or discharged from the battery unit as appropriate. In addition, the compressor 31, the cutoff valve 22, the purge valve 25, and etc. are also included in the electric power consuming system, and these are operated by the fuel cell stack 10 and the battery unit as the power sources.

<IG>

The IG 61 is a start-up switch of the fuel cell vehicle and the fuel cell system 1, and disposed around the driver seat. In addition, the IG 61 is connected to the ECU 70, and the ECU 70 detects an ON/OFF signal of the IG 61.

<ECU>

The ECU 70 is a control unit for electronically controlling the fuel cell system 1, and includes, for example, a CPU, ROM, RAM, various kinds of interface, and electronic circuit. The ECU 70 executes various kinds of processing according to programs stored therein.

When the fuel cell stack 10 may be exposed in a low temperature environment during a shutdown of the system, thereby when an inside of the fuel cell stack 10 may freeze, the ECU 70 has a function to scavenge the fuel cell stack 10 and encapsulate a scavenging gas (non-humidified air) in the anode flow path 11 and the cathode flow path 12 by controlling the purge valve 25, compressor 31, scavenging valve 41, and etc as needed. If it is determined that the inside of the fuel cell stack 10 may freeze, the result of the determination is temporarily stored using a flag corresponding to freezing.

Whether the fuel cell stack 10 may freeze or not when the fuel cell stack 10 is exposed in a low temperature environment after stopping the system can be determined as follows. For example, the temperature T1 of the fuel cell stack 10 during a shutdown is less than a freezing determination temperature (for example, 0° C.), the determination may be made that the fuel cell stack 10 may freeze.

Otherwise, even if the temperature T1 during the shutdown is not less than the freezing determination temperature, when the temperature T1 is forecasted to lower less than the freezing determination temperature based on, for example, weather forecast, the determination may be made that the fuel cell stack 10 may freeze. In addition, for example, by intermittently monitoring the temperature T1 after stopping the system (IG 61: OFF), and when the temperature T1 lowers less than the freezing determination temperature, the scavenging gas may be encapsulated into the anode flow path 11 and etc. after scavenging the fuel cell stack 10 by operating the compressor 31 and etc. as needed.

In addition, the ECU 70 (cold start determination means) is provided with a function to determine whether or not the fuel cell stack 10 is started with the cold start at the starting of the system, based on the flag corresponding to a freezing possibility of the fuel cell stack 10. That is, if the determination is made that the inside of the fuel cell stack 10 may be frozen based on the flag, the ECU 70 starts the fuel cell system 1 with the cold start for rapidly unfreezing the fuel cell stack 10 by promoting warming up of the fuel cell stack 10 with a self-heating accompanying the electric power generation.

In addition, the ECU 70 (shutdown time detection means) is provided with a function to detect an electric power generation shutdown time of the fuel cell stack 10, that is, to detect an ON-OFF time of the IG 61 (contactor 53) by utilizing an internal clock.

Figure 3:
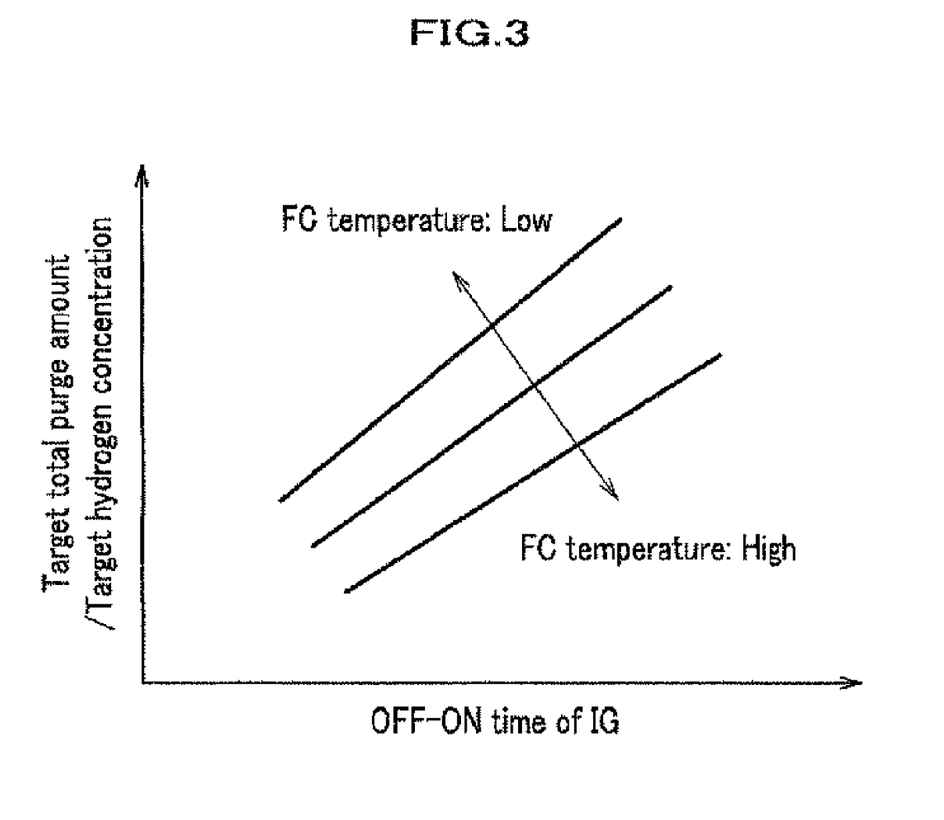
FIG. 3 is a map showing relationships among OFF-ON time (shutdown time of electric power generation) of IG, a system temperature, and a target layer purging amount (target hydrogen concentration)

Further, the ECU 70 is provided with a function to calculate a total gas amount (target total purge amount in usual start-up) to be discharged to the diluter 32 by opening the purge valve 25 at the staring of the system for increasing a hydrogen concentration in the anode flow path 11 at the starting of electric power generation so as to prevent a shortage of hydrogen after starting the electric power generation of the fuel cell stack 10, based on the ON-OFF time of the IG 61, the temperature T1 of the fuel cell stack 10 during ON of the IG 61, and the map shown in FIG. 3. It is noted that in the gas to be discharged to the diluter 32, gases discharged from the anode flow path 11 and pipes 25*a*, 25*c*, and 24*a* are included.

Here, as shown in FIG. 3, since it is considered that as the OFF-ON time of the IG 61 becomes long, impurities (for example, nitrogen) in the anode flow path 11 increase, and thereby the effective reaction cross section of the MEA is narrowed by freezing, the total purge amount becomes large as the OFF-ON time becomes long. In addition, since it is considered that as the temperature T1 of the fuel cell stack 10 during ON of the IG 61 lowers, the effective reaction cross section of the MEA is narrowed by freezing, the total purge amount becomes large as the temperature T1 lowers.

It is noted that the map shown in FIG. 3 is obtained by, for example, prior experiments and stored in the ECU 70 in advance.

In addition, the ECU 70 (current total purge amount detection means) is provided with a function to detect a current total purge amount (total discharge amount) of gas supplied to the diluter 32 by the opening of the purge valve 25 after starting up the system.

Specifically, the ECU 70 calculates the current total purge amount based on a pressure in upstream of the purge valve 25 (secondary pressure of pressure regulator 23), a degree of gate opening (gas flow path cross section at open state) of the purge valve 25, and an open time of the purge valve 25. In addition, the current total purge amount can be calculated by disposing a flow sensor in the pipe 25*b*, and based on a flow rate (1/min) detected by the flow sensor and open time of the purge valve 25. Further, if the purge valve 25 is opened and closed plural times, the current total purge amount is given by a sum of each purge amount in each open time of the purge valve 25.

Further, the ECU 70 (oxidant gas integrated amount detection means) is provided with a function to detect (calculate) an integrated amount of the cathode off-gas (oxidant gas) supplied to the diluter 32 while the purge valve 25 is closed. In the embodiment, the compressor 31 operates with a constant rotation speed. Therefore, the ECU 70 detects the integrated amount of the cathode off-gas supplied to the diluter 32 based on a product of a discharge rate (1/min) per unit time of the compressor 31 and a closing time of the purge valve 25.

In addition, the integrated amount of the cathode off-gas may be detected by disposing a flow sensor in the pipe 32*a* and based on a flow rate (1/min) detected by the flow sensor and a close time of the purge valve 25.

Still further, the ECU 70 (open-close permission determination means) is provided with a function for determining not to permit opening the purge valve 25 when an integrated amount A1 of the cathode off-gas supplied to the diluter 32 during closing of the purge valve 25 is less than a predetermined integration amount A2.

The predetermined integration amount A2 is set to a volume so that the hydrogen concentration C1 in the diluted gas lowers less than an upper limit concentration C2, which is a dischargeable concentration outside a vehicle, by diluting hydrogen supplied to the diluter 32 with the cathode off-gas even if a gas containing hydrogen is supplied to the diluter 32 by opening the purge valve 25. Therefore, the predetermined integration amount A2 of the cathode off-gas depends on, for example, a volume of a diluting space inside the diluter 32 and a secondary pressure of the pressure regulator 23, and can be obtained by, for example, prior experiments. Meanwhile, the upper limit concentration C2 may be set at, for example, an upper limit of non-ignitable hydrogen concentration.

In addition, the ECU 70 (open-close permission determination means) is provided with a function for determining not to permit opening the purge valve 25 if the hydrogen concentration C1 in the diluted gas is not less than the upper limit concentration C2 (predetermined concentration) when gases in the anode flow path 11 and etc. are supplied to the diluter 32 by opening the purge valve 25.

In addition, the ECU 70 (fuel gas exchange means) is provided with a function to exchange atmospheres in the anode flow path 11, pipes 25*a*, 25*c*, and etc. for hydrogen at the starting of the system by opening the purge valve 25, while supplying hydrogen to the anode flow path 11 from the hydrogen tank 21 by opening the cutoff valve 22.

In addition, the ECU 70 (fuel gas exchange means) is provided with a function to correctively increase a total amount (target total purge amount) of a gas to be discharged to the diluter 32 at the starting of the system if it is determined to conduct a cold start of the system by opening the purge valve 25, compared with a case determined (detected) not to conduct the cold start, that is, in comparison with a case of normal start up. A degree of the corrective increase of the target total purge amount depends on specifications of the fuel cell system 1, for example, volumes of the anode flow path 11, the pipe 25*a*, and etc., and a degree (degree of narrowing of effective reaction cross section by freezing) of freezing according to the material of the MEA, and can be obtained in advance by, for example, prior experiments.

In addition, as described above, the ECU is provided with a function to close or continuously close the purge valve 25 if it is determined not to permit opening the purge valve 25, that is, when the integrated amount A1 of the cathode off-gas is less than the predetermined integration amount A2, or when the hydrogen concentration C1 in the diluted gas is not less than the upper limit concentration C2.

In addition, the ECU is provided with a function to determine permission for starting electric power generation of the fuel cell stack 10 when the current total purge amount becomes not less than the target total purge amount (target total purge amount after corrective increase when cold start is conducted). A case that the current total purge amount became not less than the target total purge amount is the case that a hydrogen concentration in the anode flow path 11 is estimated reached a target hydrogen concentration which does not cause shortage of hydrogen even if the electric power generation is started.

<<Operations of Fuel Cell System>>

Next, operations of the fuel cell system 1 will be explained together with a flow of programs (flowchart) installed in the ECU 70. After a brief explanation for the operations during a shutdown of the system at OFF state of the IG 61, the operations at the starting of the system at ON state of the IG 61 will be explained.

<Operations at IG-Off State>

If the IG 61 is turned OFF by a driver for stopping a fuel cell vehicle, the ECU 70 which detected an OFF signal of the IG 61 determines whether or not an inside of the fuel cell stack 10 may freeze by being exposed in a low temperature environment. For example, if the temperature T1 is less than a predetermined determination temperature (for example 0° C.) when the IG 61 is at OFF state, it is determined that the inside of the fuel cell stack 10 may freeze, and the determination result is temporarily stored in the ECU 70 using a flag. On the other hand, if the temperature T1 is not less than the predetermined determination temperature (for example 0° C.), it is determined that the inside of the fuel cell stack 10 may not freeze.

If it is determined that the inside of the fuel cell stack 10 may freeze, the ECU 70 scavenges the fuel cell stack 10, and encapsulates a scavenging gas (non-humidified air) in the anode flow path 11.

Specifically, the ECU 70 closes the cutoff valve 22 and turns OFF the contactor 53, while operating the compressor 31. By the operations described above, electric power generation of the fuel cell stack 10 is stopped. Then, the ECU 70, for example, intermittently opens the purge valve 25 after opening the scavenging valve 41, and supplies air from the compressor 31 to the anode flow path 11 as the scavenging gas. In this case, non-humidified air is supplied as the scavenging gas by getting around a humidifier (not shown) on the pipe 31a.

Therefore, a moisture (water vapor) in the anode flow path 11, a moisture attached to the anode of the MEA, and a remaining hydrogen and moisture in the pipes 24a, 25a, 25c are discharged outside through the diluter 32 and etc. . . . At the same time, exchanging hydrogen in the anode flow path 11 for the air proceeds. In addition, concurrently with the discharge and exchanging, the scavenging gas (non-humidified air) from the compressor 31 is also supplied to the cathode flow path 12. Therefore, a remaining moisture in the cathode flow path 12 is discharged outside through the pipe 32a and etc. After a predetermined time elapsed, the compressor 31 is stopped and the purge valve 25 and scavenging valve 41 are closed.

As described above, insides of the anode flow path 11, cathode flow path 12, pipes 25a, 32a, and etc. are scavenged, that is, the moistures inside the anode flow path 11 and etc. are discharged outside, and thereby the insides of the fuel cell stack 10 and etc. become hard to freeze. In addition, since the scavenging gas (non-humidified air) is encapsulate in the anode flow path 11 and cathode flow path 12, the OCV is not generated in each single cell of the fuel cell stack 10 during a shutdown of the system. Therefore, a current by the generation of the OCV does not flow in each single cell, thereby resulting in no degradation (for example, decomposition of electrolyte membrane) of the MEA. Accordingly, endurance of the fuel cell stack 10 can be improved.

<Operations at IG-On State>

Next, operations of the fuel cell system 1 after the IG 61 is turned ON by a driver will be explained by referring to FIG. 2. It is noted that the cutoff valve 22, the purge valve 25 and the scavenging valve 41 are closed before the IG 61 is turned ON. If scavenging of the fuel cell stack 10 was conducted when the IG 61 was at OFF state, air is encapsulated in advance in the anode flow path 11 and etc. In addition, the compressor 31 is being stopped and the contactor 53 is at OFF state.

In step S101, the ECU 70 detects a time (OFF-ON time of IG 61) from a last turning OFF to a present turning ON of the IG 61 by utilizing an internal clock.

In step S102, the ECU 70 detects a current temperature T1 of the fuel cell stack 10 by the temperature sensor 26.

In step S103, the ECU 70 sets a target total purge amount for a case when the fuel cell system 1 is normally started (when cold start is not conducted), based on the OFF-ON time of the IG 61 detected in the step S101, the temperature T1 of the fuel cell stack 10 detected in the step S102, and the map in FIG. 3.

In step S104, the ECU 70 determines whether to start or not to start the fuel cell system 1 with the cold start by referring to the flag described above.

Specifically, if it was recorded by the flag that the system might freeze, the ECU determines to conduct the cold start (S104: Yes), and processing of the ECU 70 proceeds to step S105. On the other hand, if recorded that the system might not freeze, the ECU determines not to conduct the cold start (S104: No), and the processing of the ECU 70 proceeds to step S106.

However, the determination of whether to conduct or not to conduct the cold start of the fuel cell system 1 is not limited to this. For example, if the temperature T1 is less than a predetermined determination temperature (for example, 0° C.) when the IG 61 is at ON state, conducting the cold start may be determined since the inside of the fuel cell stack 10 might freeze.

In the step S105, the ECU 70 corrects the target total purge amount, which is set in the step S103, to be increased. That is, the ECU 70 increases the target total purge amount when detected not to conduct the cold start (S104: No). Therefore, a hydrogen concentration in the anode flow path 11 at the starting of the electric power generation is corrected to be increased.

In the step S106, the ECU 70 starts operation of the compressor 31 and supplies an air to the cathode flow path 12. This discharges cathode off-gas from the cathode flow path 12 and supplies the cathode off-gas to the diluter 32. Then, a portion of the cathode off-gas starts to accumulate in the diluter 32.

Concurrently with the above process, the ECU 70 integrates a cathode off-gas amount supplied to the diluter 32. The integration of the cathode off-gas is conducted when the purge valve 25 is closed, and reset in step S112 as described later.

In step S107, the ECU 70 opens the cutoff valve 22. This pushes hydrogen into the anode flow path 11 from the hydrogen tank 21 via the cutoff valve 22, regulator 23, and etc., thereby proceeding exchanging atmospheres for hydrogen, and as a result, a hydrogen concentration in the anode flow path 11 starts to increase.

Figure 4:
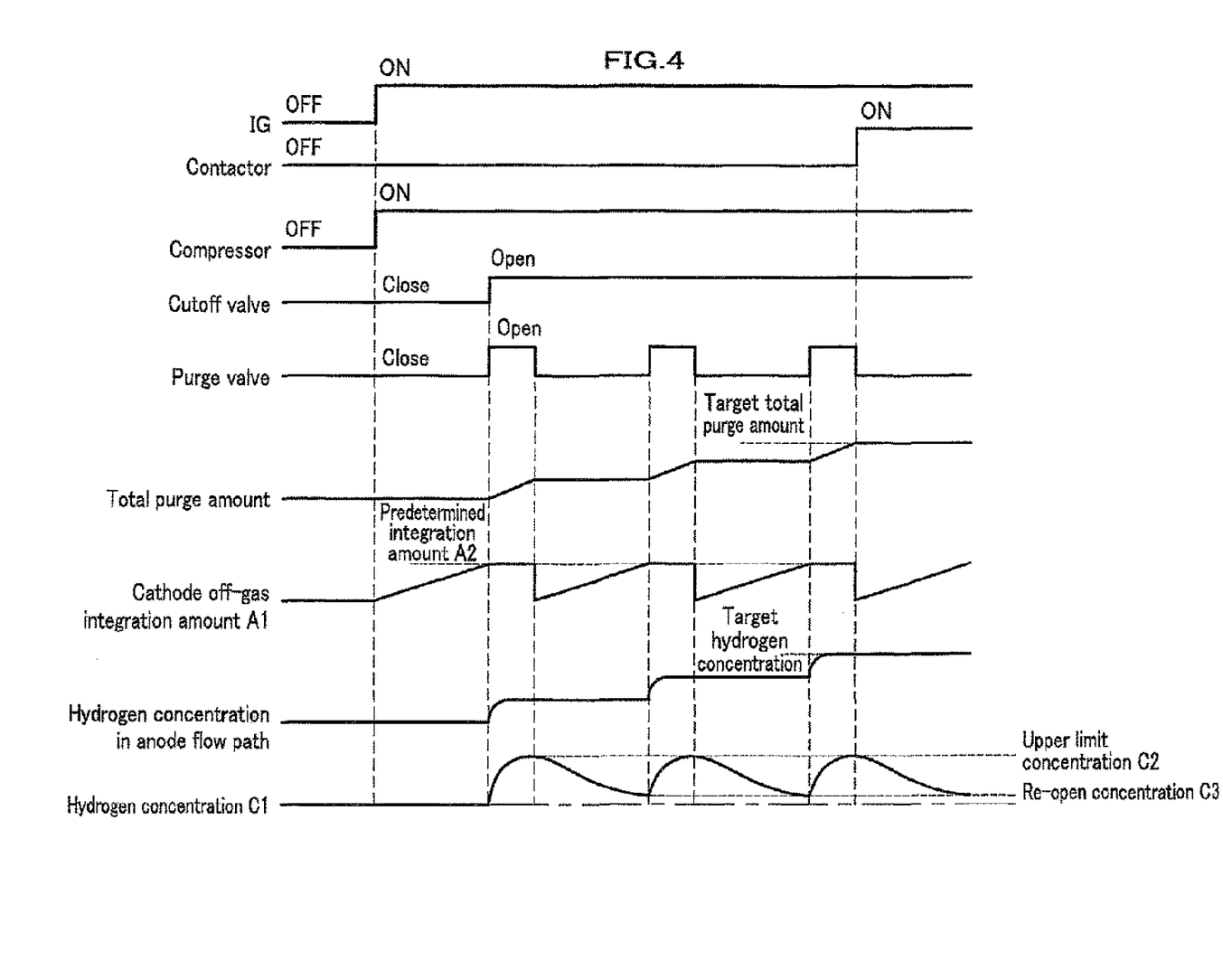
FIG. 4 is a time chart showing one operation example of a fuel cell system.

It is noted that a timing for opening the cutoff valve 22 is set at a time after a forecasted time elapsed after starting operation of the compressor 31 in the step S106 (see FIG. 4). The forecasted time is a time that a current integrated amount A1 of the cathode off-gas becomes not less than a predetermined integration amount A2.

In step S108, the ECU 70 opens the purge valve 25. Then, as gases (mainly, air) inside the anode flow path 11 and etc. are discharged to the diluter 32, a pressure inside the anode flow path 11 decreases, and thereby the regulator 23 opens. As a result, hydrogen is newly supplied to the anode flow path 11 from the hydrogen tank 21, and thereby exchanging atmosphere inside the anode flow path 11 for hydrogen proceeds, thereby resulting in increase in a hydrogen concentration inside the anode flow path 11.

Here, it may be allowed to open the cutoff valve 22 without waiting elapse of the forecasted time in the step S107 and open the purge valve 25 after elapse of the forecasted time in the step S108.

In step S109, the ECU 70 determines whether or not a current total purge amount is not less than the target total purge amount (target total purge amount after correctively increased in step S105 when system starts with cold start) set in the step S103.

If it is determined that the current total purge amount is not less than the target total purge amount (S109: Yes), the fuel cell stack 10 is permitted to start electric power generation, and the processing of the ECU 70 proceeds to step S114. In this case, it is estimated that a hydrogen concentration in the anode flow path 11 is increased to a concentration which does not cause a shortage of hydrogen even when the fuel cell stack 10 starts electric power generation, by the progress of exchanging atmosphere in the anode flow path 11 for hydrogen due to reaching of the current total purge amount to the target total purge amount.

On the other hand, if it is determined that the current total purge amount is less than the target total purge amount (S109: No), the fuel cell stack 10 is not permitted to start the electric power generation, and the processing of the ECU 70 proceeds to step S110.

In the step S110, the ECU 70 determines whether or not the hydrogen concentration C1 in the diluted gas to be discharged outside the vehicle from the diluter 32 is not less than the upper limit concentration C2.

If it is determined that the hydrogen concentration C1 is not less than the upper limit concentration C2 (S110: Yes), the processing of the ECU 70 proceeds to step S111. On the other hand, if determined that the hydrogen concentration C1 is less than the upper limit concentration C2 (S110: No), the processing of the ECU 70 proceeds to the step S108. In this case, opening of the purge valve 25 is continued.

In the step S111, the ECU 70 closes the purge valve 25. Therefore, discharging hydrogen outside through the purge valve 25 is stopped.

In step S112, the ECU 70 starts integration of a cathode off-gas amount again after resetting the integration of the cathode off-gas amount supplied to the diluter 32.

In step S113, the ECU 70 determines whether or not the current cathode off-gas integration amount A1 is not less than the predetermined integration amount A2.

If the current integration amount A1 is not less than the predetermined integration amount A2 (S113: Yes), the processing of the ECU 70 proceeds to the step S110. In this case, even if a gas including hydrogen inside the anode flow path 11 is supplied to the diluter 32 by opening the purge valve 25 because the cathode off-gas integration amount A1 became not less than the predetermined integration amount A2, it is estimated that the hydrogen concentration C1 in the diluted gas does not immediately become not less than the upper limit concentration C2 due to excellent dilution of the hydrogen through the diluter 32.

After that, in the step S110, if it is found that the current hydrogen concentration C1 in the diluted gas is less than the upper limit concentration C2 (S110: No), the processing of the ECU 70 proceeds to the step S108, and the purge valve 25 is opened again.

On the other hand, if the current integration amount A1 is less than the predetermined integration amount A2 (S113: No), the processing of the ECU 70 repeats the determination in the step S113. In this case, the purge valve 25 is continuously closed.

In step S114, the ECU 70 turns ON the contactor 53, and starts electric power generation of the fuel cell stack 10 by appropriately controlling the VCU 52.

In this case, if it was determined by referring to the flag that the inside of the fuel cell stack 10 might freeze, the ECU 70 controls the VCU 52 so that a large electric current can be output from the fuel cell stack 10 and starts the fuel cell system 1 with the cold start for promoting warming up of the fuel cell stack 10 by increasing a self-heating accompanying the electric power generation. In this case, since a hydrogen concentration in the anode flow path 11 is increased, the anode can be prevented from shortage of hydrogen, thereby resulting in good electric power generation of the fuel cell stack 10 even if the effective reaction cross section of the MEA is narrowed.

On the other hand, if determined that the inside of the fuel cell stack 10 might not freeze, the ECU 70 normally controls the VCU 52, normally outputs an electric current from the fuel cell stack 10, and normally starts the fuel cell system 1.

<<Effects of Fuel Cell System 1>>

According to the fuel cell system 1 described above, the following advantages can be mainly obtained.

When the fuel cell system 1 is started with a cold start, since the fuel cell stack 10 starts electric power generation after increasing a hydrogen concentration in the anode flow path 11 by increasing a total purge amount, the MEA is prevented from shortage of hydrogen after the electric power generation is started. Therefore, warming up of the fuel cell stack 10 can be promoted, while ensuring a stable output (electric power generation performance) of the fuel cell stack 10. In addition, since there is no shortage of hydrogen, the MEA can be prevented from degrading (for example, decomposition of electrolyte membrane), thereby resulting in improvement of endurance of the fuel cell stack 10.

Since a total purge amount is increased as the OFF-ON time of the IG 61 becomes longer and as the temperature T1 at the starting of the system is lower, an appropriate amount of the total purge amount can be set. Accordingly, hydrogen can be prevented from being discharged uselessly outside the vehicle, thereby resulting in increase in fuel economy of the fuel cell vehicle.

When the purge valve 25 is closed, since the purge valve 25 is not opened if the cathode off-gas integration amount A1 is less than the predetermined integration amount A2, a high concentration of hydrogen can be prevented from discharging outside the vehicle.

In addition, when the purge valve 25 is opened, since the purge valve 25 is closed if the hydrogen concentration C1 in the diluted gas is not less than the upper limit concentration C2, a high concentration of hydrogen can be prevented from discharging outside the vehicle.

<<One Operation Example of Fuel Cell System>>

Next, one operation example of the fuel cell system 1 will be explained by referring to FIG. 4. It is noted that the system starting with a cold start is exemplified.

When the IG 61 is turned ON, after setting a target total purge amount (S101 to S103), the target total purge amount is corrected to be increased (S104, S105) in response to the cold start and the compressor 31 is operated (S106).

After that, if the cathode off-gas integration amount A1 supplied to the diluter 32 reaches the predetermined integration amount A2, the cutoff valve 22 and purge valve 25 are opened (S107, S108).

Then, a hydrogen concentration in the anode flow path 11 increases and exchange of atmosphere in the anode flow path 11 for hydrogen proceeds. In addition, a total purge amount of gas discharged from the purge valve 25 and the hydrogen concentration C1 in the diluted gas discharged outside the vehicle from the diluter 32 increase. It is noted that when the purge valve 25 is opened, the cathode off-gas integration amount A1 is not accumulated.

Then, if the hydrogen concentration C1 reaches the upper limit concentration C2 (S110: Yes), the purge valve 25 is closed, and after resetting the cathode off-gas integration amount A1, the integration is started again (S112).

After that, if the cathode off-gas integration amount A1 reaches the predetermined integration amount A2 (S113: Yes), and if determined that the hydrogen concentration C1 is less than the upper limit concentration C2 (S110: No), the purge valve 25 is opened again (S108). Through this, the total purge amount, the hydrogen concentration in the anode flow path 11, and the hydrogen concentration C1 in the diluted gas increase. Then, if the hydrogen concentration C1 in the diluted gas reaches the upper limit concentration C2, the purge valve 25 is closed, and after resetting the integration of the cathode off-gas, when the integration amount A1 reaches the predetermined integration amount A2, the purge valve 25 is opened again (S108).

Then, after a current total purge amount reaches the corrected target total purge amount (S109: Yes), the contactor 53 is turned ON to start the fuel cell system 1 with a cold start for generating electricity with high output by the fuel cell stack 10 (S114). Here, since the target total purge amount is correctively increased in advance and a hydrogen concentration in the anode flow path 11 is increased for starting the system with the cold start, a single cell, that is, the fuel cell stack 10 can generate electricity without becoming short of hydrogen even if an effective reaction cross section of the MEA is narrowed.

The preferred embodiment of the present invention has been explained as described above. However, the present invention is not limited to the embodiment and can be modified, for example, as follows without departing from spirits of the present invention.

Figure 2:
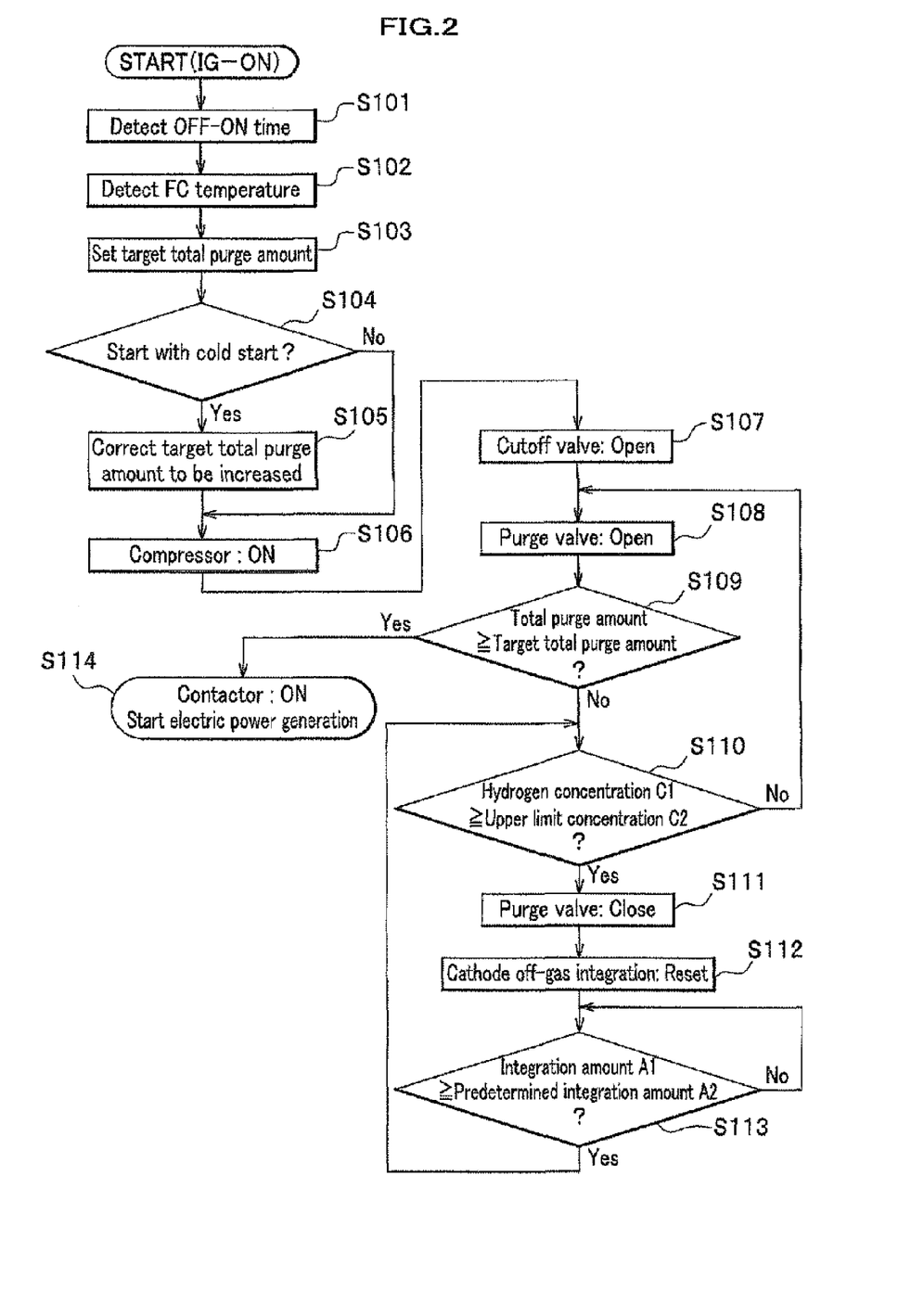
FIG. 2 is a flowchart showing operations of a fuel cell system according to the embodiment.
Figure 5:
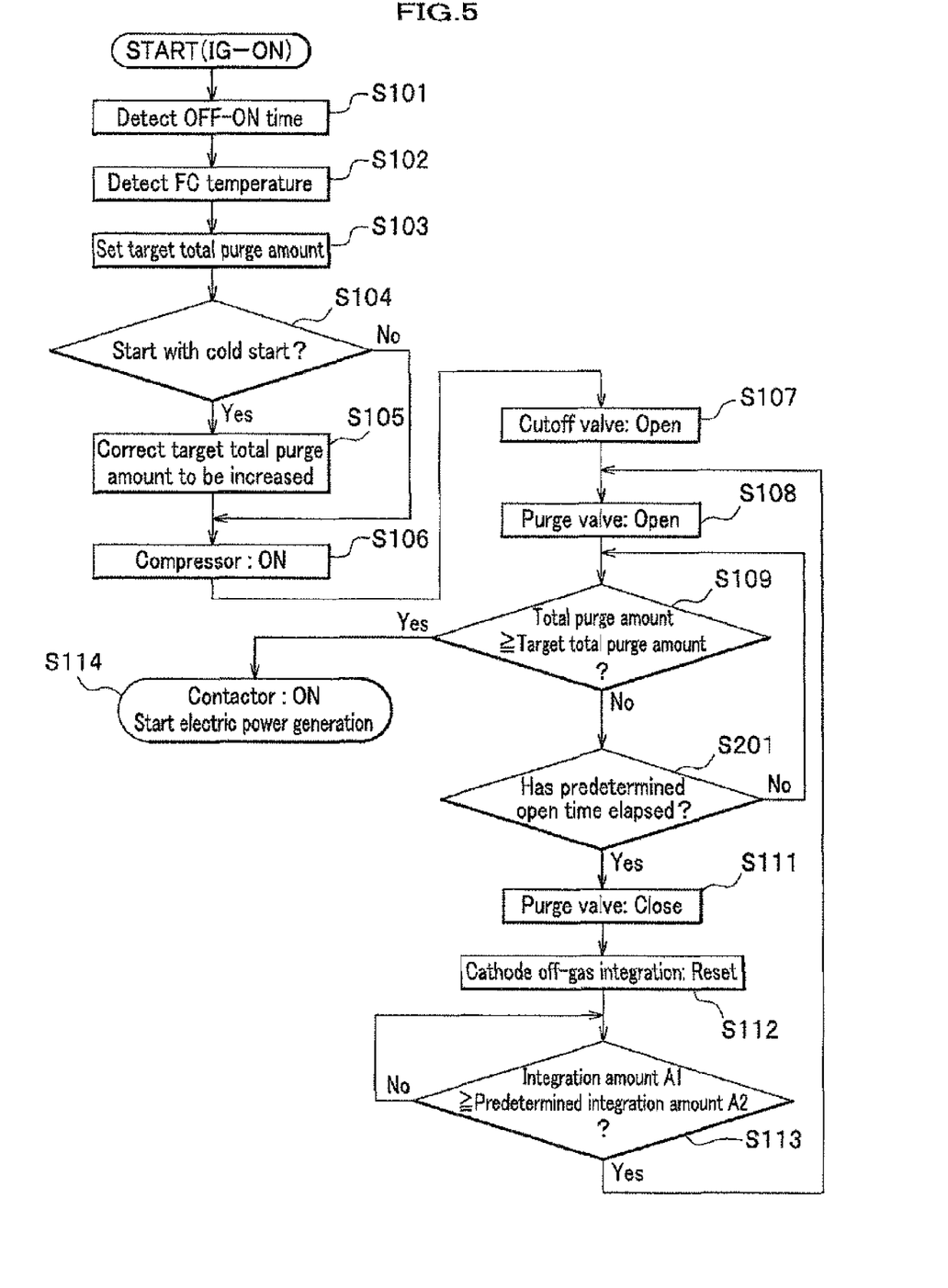
FIG. 5 is a flowchart showing operations of a fuel cell system according to a modified example.

For example, instead of the step S110 in FIG. 2, the step S201 in FIG. 5 may be conducted.

In the step S201 in FIG. 5, the ECU 70 determines whether or not a predetermined open time has elapsed after the purge valve 25 is opened in the step S108 by utilizing the internal clock.

It is noted that the predetermined open time is set so that the hydrogen concentration C1 in the diluted gas becomes less than the upper limit concentration C2 due to excellent dilution of hydrogen with the cathode off-gas remaining, for example, inside the diluter 32 even if the anode off-gas containing hydrogen is continuously supplied to the diluter 32 by continuously opening the purge valve 25. Therefore, the predetermined open time relates to, for example, an upstream pressure of the purge valve 25 (secondary pressure of regulator 23), a flow rate of the cathode off-gas, and a volume of a diluting space inside the diluter 32, and can be obtained by prior experiments.

If determined that the predetermined open time has elapsed (S201: Yes), the processing of the ECU 70 proceeds to the step S111, and the purge valve 25 is closed. Next, if the determination in step S113, which is a later step, is "Yes", the processing of the ECU 70 proceeds to the step S108, and the purge valve 25 is opened again.

On the other hand, if determined that the predetermined time has not elapsed (S201: No), the processing of the ECU proceeds to the step S109.

If a processing flow of the ECU 70 is set as described above, a system constitution can be simplified since it is unnecessary to dispose the hydrogen sensor 33.

In the embodiment described above, a case is exemplified, in which the fuel cell system 1 is provided with a hydrogen circulating system composed of, for example, the pipe 25c, and the target total purge amount A2 at the starting of the system is set considering a volume inside the pipe 25c. However, the present invention may be applied to the fuel cell system 1 which has not the hydrogen circulating system. In addition, the present invention may be applied to the fuel cell system 1 which has not the diluter 32.

In the embodiment described above, a constitution which has one temperature sensor 26 in the pipe 25a for detecting a temperature of the fuel cell stack is exemplified. However, positions and a number of the temperature sensor 26 are not limited to this. The temperature sensor may be disposed, for example, in the pipe 32a in which the cathode off-gas flows and in a pipe (not shown) in which a cooling liquid discharged from the fuel cell stack 10 after cooling thereof flows. In addition, the temperature sensor may be disposed directly in the fuel cell stack 10. Further, a plurality of temperature sensors may be disposed to avoid a false detection.

In the embodiment described above, as shown in FIG. 2, if the cathode off-gas integration amount A1 after the purge valve 25 was closed is not less than the predetermined integration amount A2 (S111 to S113: No), and if the hydrogen concentration C1 in the diluted gas is less than the upper limit concentration C2 (S110: No), the purge valve 25 is opened again (S108). However, for example, instead of the step S113, by determining that whether or not the hydrogen concentration C1 in the diluted gas is lowered to a re-open concentration C3, and if determined that the concentration C1 was lowered to the concentration C3, the purge valve 25 may be opened again (see FIG. 4). The re-open concentration C3 is set so that the hydrogen concentration C1 in the diluted gas is not immediately raised to the upper limit concentration C2 even if purging of the gas inside the anode flow path 11 and etc. is restarted by opening the purge valve 25 again.

In the embodiment described above, a case is exemplified, in which when the fuel cell system 1 is exposed to a low temperature environment during a shutdown, air is encapsulated in the anode flow path 11 and etc. after scavenging thereof, and the fuel cell system 1 is started with a cold start at the next starting. However, the present invention may be applied to the fuel cell system in which the anode flow path 11 is not scavenged at the shutdown of the system and the air is not encapsulated in the anode flow path 11 during the shutdown of the system. For example, when the IG 61 is at ON state (at starting of system), if the temperature T1 is less than 0° C., the target total purge amount may be correctively increased by determining that the system is started with a cold start later and based thereon.

In the embodiment described above, a case in which the fuel cell system 1 is installed in a fuel cell vehicle is exemplified. However, other than the fuel cell vehicle, the fuel cell system 1 may be installed in a two-wheeled motor vehicle, train, and ship. In addition, the present invention may be applied to a stationary home fuel cell system and a fuel cell system integrated with a water heater.

What is claimed is:

1. A method for operating a fuel cell system including a fuel cell that has a fuel gas flow path and an oxidant gas flow path and generates electricity if a fuel gas is supplied to the fuel gas flow path and an oxidant gas to the oxidant gas flow path, and when the fuel cell system is started, an atmosphere inside the fuel gas flow path is exchanged for the fuel gas by opening a discharge valve, while supplying the fuel gas flow path, the method comprising steps of:

determining whether or not to conduct a cold start of the system; and when the cold start is determined, increasing a fuel gas concentration in the fuel gas flow path by increasing a total discharge amount of a gas to be discharged by opening the discharge valve detecting a shutdown time of electric power generation of the fuel cell, wherein the total discharge amount of the gas to be discharged by opening the discharge valve is increased as the detected shutdown time of electric power generation becomes longer.

2. The method according to claim 1, further comprising a step of: detecting a temperature of the fuel cell, wherein the total discharge amount of the gas to be discharged by opening the discharge valve is increased as the detected temperature becomes lower.

3. The method according to claim 1, further comprising steps of: mixing the gas discharged from the discharge valve and the oxidant gas discharged from the oxidant gas flow path; and detecting an oxidant gas integration amount, wherein if the detected oxidant gas integration amount is less than a predetermined integration amount, the discharge valve is closed.

4. The method according to claim 1, further comprising a step of: detecting a fuel gas concentration in the gas to be discharged outside, wherein if the detected fuel gas concentration is not less than a predetermined concentration, the discharge valve is closed.

5. The method according to claim 1, further comprising a step of: determining whether or not a current total purge amount is not less than a target total purge amount, wherein if the current total purge amount is less than the target total purge amount, electric power generation of the fuel cell is not permitted.

6. The method according to claim 1, further comprising a step of: determining whether or not a predetermined time has elapsed after the purge valve is opened, wherein if the predetermined time has elapsed, the purge valve is closed.

7. A method for operating a fuel cell system including a fuel cell that has a fuel gas flow path and an oxidant gas flow path and generates electricity if a fuel gas is supplied to the fuel gas flow path and an oxidant gas to the oxidant gas flow path, and when the fuel cell system is started, an atmosphere inside the fuel gas flow path is exchanged for the fuel gas by opening a discharge valve, while supplying the fuel gas flow path, the method comprising steps of:
   determining whether or not to conduct a cold start of the system; and when the cold start is determined,
   increasing a fuel gas concentration in the fuel gas flow path by increasing a total discharge amount of a gas to be discharged by opening the discharge valve
   determining whether or not a current total purge amount is not less than a target total purge amount, wherein if the current total purge amount is less than the target total purge amount, electric power generation of the fuel cell is not permitted.

8. The method according to claim 7, further comprising a step of: detecting a shutdown time of electric power generation of the fuel cell, wherein the total discharge amount of the gas to be discharged by opening the discharge valve is increased as the detected shutdown time of electric power generation becomes longer.

9. The method according to claim 7, further comprising a step of: detecting a temperature of the fuel cell, wherein the total discharge amount of the gas to be discharged by opening the discharge valve is increased as the detected temperature becomes lower.

10. The method according to claim 7, further comprising steps of: mixing the gas discharged from the discharge valve and the oxidant gas discharged from the oxidant gas flow path; and detecting an oxidant gas integration amount, wherein if the detected oxidant gas integration amount is less than a predetermined integration amount, the discharge valve is closed.

11. The method according to claim 7, further comprising a step of: detecting a fuel gas concentration in the gas to be discharged outside, wherein if the detected fuel gas concentration is not less than a predetermined concentration, the discharge valve is closed.

12. The method according to claim 7, further comprising a step of: determining whether or not a predetermined time has elapsed after the purge valve is opened, wherein if the predetermined time has elapsed, the purge valve is closed.

* * * * *